Re. 24889
July 3, 1956  E. S. TUPPER  2,752,972
CONTAINER AND COVER THEREFOR
Filed Dec. 24, 1952
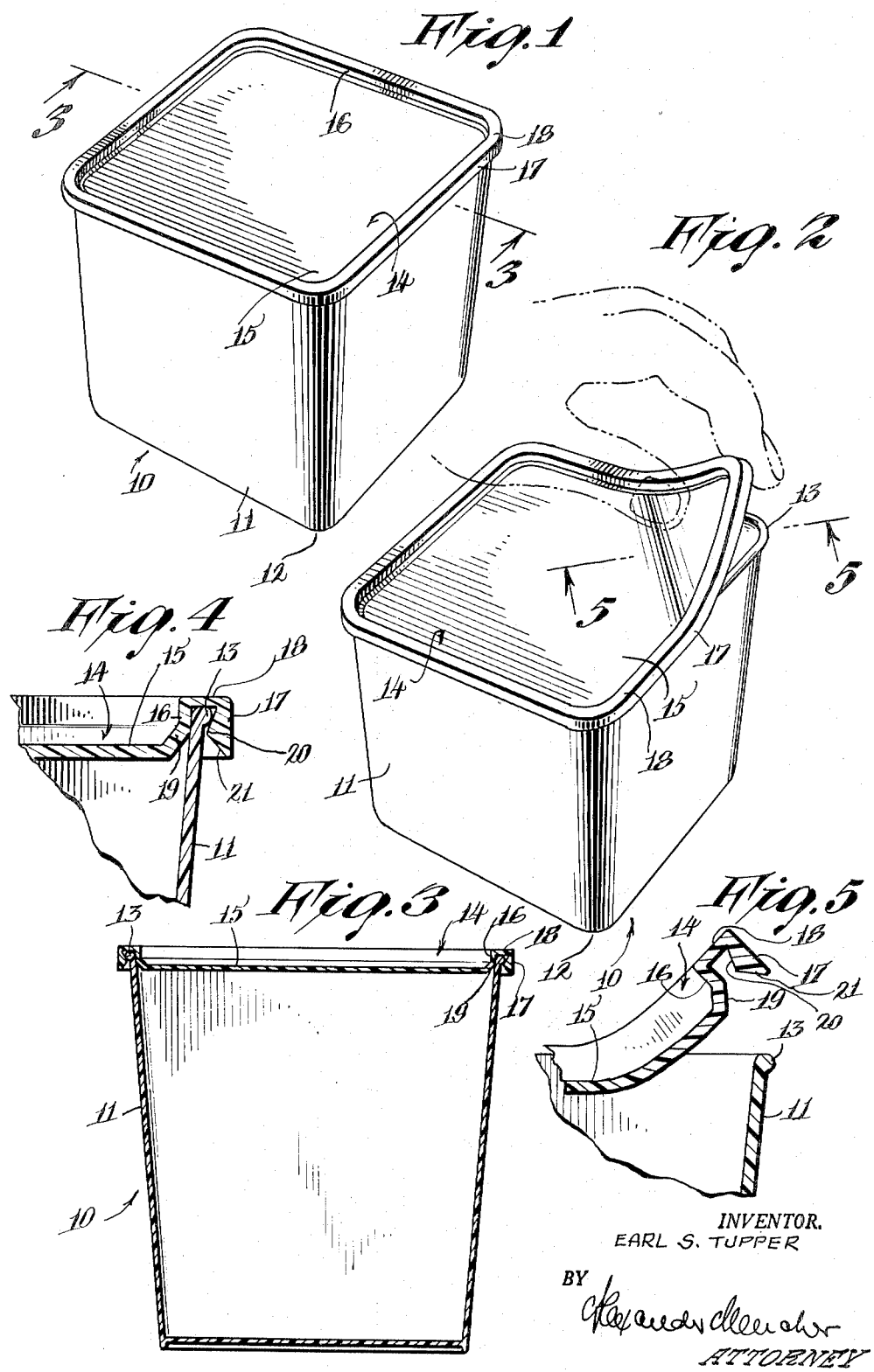
INVENTOR.
EARL S. TUPPER
BY
ATTORNEY

United States Patent Office 2,752,972
Patented July 3, 1956

2,752,972
CONTAINER AND COVER THEREFOR

Earl S. Tupper, Upton, Mass.

Application December 24, 1952, Serial No. 327,743

4 Claims. (Cl. 150—.5)

This invention relates generally to containers and covers therefor including adaptation for storing food, medicines or chemicals requiring maintenance of sterility and substantially hermetical sealing, said containers and covers also being adapted for storing in refrigerators or frozen food lockers.

A main object of the invention resides in the provision of a receiving vessel capable of being sealed at all times to serve as an efficient and seal-tight enclosure whereby odors and vapors are prevented from escaping to the surrounding storage space or atmosphere and whereby the contents are preserved in the freshness thereof by reason of containment of the diffusible ingredients.

Another object of the invention resides in the provision of a vessel and cover which by virtue of shape will retain rigidity and strength notwithstanding the weight of the contents and external pressures applied thereto; but yet wherein the vessel and cover are capable of being formed of resilient and locally distortable material such as polyethylene and other material having similar physical characteristics.

A further feature of the invention resides in the provision of a vessel structure which will maintain a removable cover for sealing relationship regardless of substantial agitation of the vessel and contents, regardless of conventional conditions leading to expansion and contraction of the vessel and cover composition, and regardless of usual changes of pressure inside the vessel and cover due to expansion and contraction of the vessel contents.

Although the invention embraces a vessel body formed of any relatively rigid or difficultly distortable material such as polystyrene, it is particularly applicable to a body formed of a resilient and locally distortable material such as polyethylene which is chemically inert, sterile and resistant to micro-organisms, mildews and insects, unbreakable, odorless, light in weight, washable and unaffected by working temperatures. But regardless of whether polystyrene or polyethylene is used, a tight seal is always maintained despite the fact that polystyrene is subject to greater dimension changes for temperature variations than polyethylene.

It is furthermore an object of the invention herein to provide the vessel or container described with a cover or closure member made of polyethylene or other substance having similar characteristics.

The accomplishment of a seal tight closure for the vessel is due to the nature of the joint structure between the closure member and the vessel, the elements being so arranged that the joint becomes tighter with increase of pressure within the vessel impinging against the vessel and cover walls as will hereinafter be more fully set out. Furthermore, in accordance with the joint structure of the invention, sealing relationship between the vessel and the closure member at no time is broken with decrease of internal pressure and with increase or decrease of external pressure experienced in air travel.

A further object of the invention resides in the provision of a device which is sanitary, durable, efficient in operation and economical to produce.

The above objects and other incidental ends and advantages of the invention will hereinafter appear in the progress of the disclosure and as pointed out in the appended claims.

Accompanying this specification is a drawing showing a preferred form of the invention wherein:

Figure 1 is a view in perspective showing the assembly of a cover in sealing engagement with a cooperating vessel.

Figure 2 is a view in perspective of the device shown in Figure 1 wherein the cover is in the process of removal.

Figure 3 is a sectional view of the device across the plane 3—3 of Figure 1.

Figure 4 is a fragmentary and enlarged sectional view showing the seal-tight joint between the cover or closure member and the rim region of the vessel.

Figure 5 is a fragmentary, sectional and enlarged view of Figure 2 across the plane 5—5 thereof.

In accordance with the invention and a form shown, the container or vessel generally indicated by numeral 10 may be formed from any rigid material such as glass, composition or even metal as well as relatively stiff plastic such as polystyrene. However, by reason of shape and structure, vessel 10 is preferably formed of polyethylene or other material having similar physical characteristics such as resiliency and local distortability. Vessel 10 as shown is provided with a peripheral side wall 11 rounded at the corners as at 12. It is to be noted that the side walls are substantially straight and tapered if desired, while the rounded corners 12 contribute to the control of distortability of the general shape of the vessel thereby permitting the walls to be made of lighter gauge. The load of the contents, it will be seen, is not sufficient to distort the vessel shape sufficiently to affect the sealing characteristics with the cover or closure member as will hereinafter be described. Vessel 10 moreover, may be molded by compression or injection as desired.

The upper outer edge rim portion of the peripheral side and corner walls has a peripheral bead 13 extending from the inner rim edge, the said bead projecting beyond the outer surfaces of each of the adjacent wall portions 11 and 12.

Vessel 10 is provided with a cover or closure member made of polyethylene or other material having similar characteristics. The closure member, generally indicated by numeral 14, by virtue of the composition thereof is locally distortable, resilient and frictional thereby being especially suitable as a seal with vessels made of any type of material. However, with vessel 10 formed of polyethylene, the cover member forms a live and mutually resilient seal at the joint as will hereinafter be described.

More specifically, the cover or closure member is comprised of a central wall 15 having an engaging and grooved rim for the edge of the vessel 10, the said rim following the shape of the vessel rim.

Engagement between closure member 14 and vessel 10 generally follows and is based on structure found in United States Patent Number 2,487,400 issued to applicant herein on November 8, 1949. However, the present invention is an improvement thereover.

Thus, the cover member has an upwardly extending and vessel rim-receiving peripheral groove delineated by spaced inner and outer walls 16 and 17 respectively, said walls being connected by a top wall 18.

Central wall 15 connects with wall 16 as by inclined wall 19, while the inner side 20 of wall 17 is downwardly and outwardly inclined. Bottom 21 of side wall 17 is offset for finger engaging purposes, and as a result of the inclination of side 20, side wall 17 is progressively thicker therealong than the substantially uniform thickness of inner and top walls 16 and 18 for a purpose hereinafter described.

The receptacle or vessel bead 13 and the inner faces of groove walls 16, 17 and 18 serve to form a sealing joint which becomes more resistant to opening with increases and decreases of internal pressure within the vessel by reason of the fact that inclined inner side 20 of groove outer wall 17 extends below and inside of the outermost point of bead 13 and the differential thickness of outer wall 17 is under progressively greater compression with the upward and downward movement of the cover 14 until the bottom peripheral edge of inner side 20 is free of the outermost dimension of bead 13.

On the other hand, for purposes of removing closure member 14, the type of obstruction described is not met. Thus, the flared bottom 21 of wall 17 is first engaged by a finger while at the same time another finger depresses central wall 15 of cover 14 as seen in Figure 2. This results in a spreading between groove walls 16 and 17 for release of bead 13 after which the cover is removed in a peeling-off type of operation.

When bead 13 is fully engaged by the peripheral groove delineated by walls 16, 17 and 18, the mutually yieldable sealing points (if vessel 11 is of polyethylene or the like) are between the intermediate portion of inner side 20 of outer wall 17 and the underside of wall 18 with respect to bead 13. The side of wall 16 contacts the inner side of the upper portion of walls 11 and 12 as shown in Figure 4 when the parts are suitably but not necessarily so dimensioned.

In order to apply closure member 14 to vessel 10, it is preferable to apply the corner portion of the peripheral groove first to a corner portion of the vessel bead 13, and thereafter the remainder is engaged by progressive finger movement and pressure along groove wall 18 overlying the beaded rim of the vessel.

One of the reasons why vessel 10 need not necessarily be made of a difficultly distortable plastic such as polystyrene is that yieldability of the vessel walls 11 between corners 12 and adjacent the joint formed between the engagement of the cover and the beaded rim of the vessel will not separate bead 13 with respect to its position relative to groove walls 16, 17 and 18 because inclined side 20 traps bead 13 and prevents it from becoming free thereof. On the other hand inclined wall 19 on the outer surface serves as a limitation for inward displacement of vessel walls 11.

Undue external pressure applied to cover wall 15 has a tendency to lift groove wall 17, but in so doing this pressure is resisted by the progressively increased pressure between the bead 13 and the inclined side 20 of groove wall 17.

Any possible variations in expansion and contraction between the cover and the vessel, it has been found, will not exceed the limits of the sealing positions between bead 13 and the sealing areas of walls 18 and 20 of the cover. Furthermore, it has been found that the central wall 15 of the closure member is sufficiently resilient to accommodate itself to differences in pressure by becoming bowed either in the form of a concave or convex surface, there being sufficient play furnished by cover inclined wall 19.

I wish it understood that minor changes and variations in the size, shape, thickness, integration and composition of material utilized in the invention may be resorted to without departing from the spirit of the invention and the scope of the appended claims.

I claim:

1. A container having rounded corners and a mouth rim having a peripheral and external rounded bead, a closure member of polyethylene or other substance having similar physical properties and being of the same configuration and having a central wall and an upwardly offset peripheral and inverted sealing rim groove having inner, outer and connecting groove walls engageable with the container mouth rim and bead, the inner groove wall at the lower end thereof being connected to the central wall by an inwardly inclined portion, the outer groove wall being relatively thicker than the other groove walls, the inner side of the outer groove wall being inclined inwardly and extending inwardly of and below said bead when compressedly in engagement therewith and the bottom of said outer groove wall being flared for removal of the closure member from the container by finger engagement, said inner side of the outer groove wall offering progressively increasing resistance to removal of the closure member from the rim and bead of the container.

2. A container as set forth in claim 1 wherein the lateral dimension of the inner side of the outer groove wall along the surface is normally less than the lateral dimension of said external bead contactable therewith.

3. A container having rounded corners and a mouth rim having a peripheral and external bead, a closure member of polyethylene or other substance having similar physical properties being of the same configuration and having a central wall and an upwardly offset peripheral and inverted sealing rim groove having inner, outer and connecting groove walls each engageable respectively with the container inner rim wall, the outer face of and the top of the bead, the lower portion of the inner groove wall inclining outwardly, the outer groove wall being relatively thicker than the other groove walls, the inner side of the outer groove wall being inclined inwardly and extending inwardly of and below said bead when compressedly in engagement therewith and the bottom of said outer groove wall being flared for removal of the closure member from the container by finger engagement, said inner side of the outer groove wall offering progressively increasing resistance to removal of the closure member from the rim and bead of the container.

4. A container as set forth in claim 3, wherein the lateral dimension of the inner side of the outer groove wall along the surface is normally less than the lateral dimension of said external bead contactable therewith.

References Cited in the file of this patent

UNITED STATES PATENTS

| | | |
|---|---|---|
| 1,430,685 | Sampson | Oct. 3, 1922 |
| 1,694,851 | Glass | Dec. 11, 1928 |
| 2,134,441 | Geluso | Oct. 25, 1938 |
| 2,487,400 | Tupper | Nov. 8, 1949 |
| 2,606,586 | Hill | Aug. 12, 1952 |
| 2,614,727 | Robinson | Oct. 21, 1952 |
| 2,695,645 | Tupper | Nov. 30, 1954 |